United States Patent
Baruch et al.

(10) Patent No.: US 10,372,556 B1
(45) Date of Patent: Aug. 6, 2019

(54) RECOVERY OF NODES

(71) Applicant: EMC Corporation, Hopkinton, MA (US)

(72) Inventors: Leehod Baruch, Rishon Leziyon (IL); Assaf Natanzon, Tel Aviv (IL); Ron Bigman, Holon (IL); Jehuda Shemer, Kfar Saba (IL); Amit Lieberman, Raanana (IL)

(73) Assignee: EMC IP Holding Company, Hopkinton, MA (US)

( * ) Notice: Subject to any disclaimer, the term of this patent is extended or adjusted under 35 U.S.C. 154(b) by 73 days.

(21) Appl. No.: 15/197,857

(22) Filed: Jun. 30, 2016

(51) Int. Cl.
| | | |
|---|---|---|
| *G06F 11/00* | (2006.01) | |
| *G06F 11/14* | (2006.01) | |
| *H04L 29/08* | (2006.01) | |
| *G06F 11/16* | (2006.01) | |
| *G06F 11/20* | (2006.01) | |

(52) U.S. Cl.
CPC ...... *G06F 11/1469* (2013.01); *G06F 11/1666* (2013.01); *G06F 11/2017* (2013.01); *H04L 67/1097* (2013.01); *G06F 2201/84* (2013.01)

(58) Field of Classification Search
CPC ............. G06F 11/1469; G06F 11/2017; G06F 11/1666; G06F 2201/84; H04L 67/1097
USPC ......................................................... 714/6.2
See application file for complete search history.

(56) References Cited

U.S. PATENT DOCUMENTS

| 9,235,424 B1* | 1/2016 | Wong ..................... G06Q 10/06 |
| 10,270,796 B1* | 4/2019 | Veeraswamy ....... H04L 63/1433 |
| 2013/0016106 A1* | 1/2013 | Yip ........................ G06T 11/206 345/440 |
| 2014/0095438 A1* | 4/2014 | Marwah ................ G06F 3/0649 707/639 |
| 2014/0344316 A1* | 11/2014 | Baranowsky .......... G06F 17/302 707/827 |
| 2017/0171041 A1* | 6/2017 | Knowler ............... H04L 43/045 |

OTHER PUBLICATIONS

Wikipedia "failover" pages, retrieved from https://en.wikipedia.org/wiki/Failover. (Year: 2018).*

* cited by examiner

*Primary Examiner* — Yair Leibovich
(74) *Attorney, Agent, or Firm* — Krishendu Gupta; David Kuznick (57) ABSTRACT

Embodiments of the present disclosure relate to a method, an apparatus and a computer program product of recovering from a failure of a first node within a data storage system by receiving notice from the data storage system that the first node has failed; and restoring the first node based on a heat map of data I/O activity to the first node.

15 Claims, 12 Drawing Sheets

RECOVERY OF NODES

DISCLAIMER

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This disclosure relates to storage technology.

BACKGROUND OF THE INVENTION

Computer systems are constantly improving in terms of speed, reliability, and processing capability. As known in the art, computer systems that process and store large amounts of data typically include a one or more processors in communication with a shared data storage system in which the data may be stored. The data storage system may include one or more storage devices, usually of a fairly robust nature and useful for storage spanning various temporal requirements, e.g., disk drives. One or more processors may perform respective operations using a storage system. Mass storage systems (MSS) may typically include an array of a plurality of disks with on-board intelligent and communications electronics and software for making data on the disks available.

Companies that sell data storage systems and the like may be extremely concerned with providing customers with an efficient data storage solution that minimizes cost while meeting customer data storage needs. It would be beneficial for such companies to have a way for reducing the complexity of implementing data storage.

SUMMARY OF THE INVENTION

Exemplary embodiments of the present disclosure introduce a system, a computer program product and a method for recovering from a failure of a first node within a data storage system by receiving notice from the data storage system that the first node has failed; and restoring the first node based on a heat map of data I/O activity to the first node.

BRIEF DESCRIPTION OF THE DRAWINGS

Now, some embodiments of the method and/or system according to the embodiments of the present disclosure are described only through examples with reference to the accompanying drawings; in the accompanying drawings.

DETAILED DESCRIPTION

Hereinafter, respective exemplary embodiments will be described with reference to the accompanying drawings. It should be understood that these exemplary embodiments are provided only for enabling those skilled in the art to better understand and further implement the present disclosure, not intended to limit the scope of the present disclosure in any manner.

Herein, recitations such as "one embodiment," "further embodiment," or "a preferred embodiment" and the like indicate that the embodiment as described may comprise specific features, structures or characteristics, but each embodiment does not necessarily include such specific features, structures or characteristics. The terms "comprise", "include" and the like used here should be understood as open terms, i.e., "comprise/include, but not limited to". The term "based on" means "at least partially based on". The term "one embodiment" indicates "at least one embodiment"; the term "another embodiment" indicates "at least one further embodiment". Moreover, these terms do not necessary refer to the same embodiment. It should be further understood that various terms used herein are only used to describe an objective of a specific example, not intended to limit the present disclosure. For example, the singular form "a" and "the" used herein may comprise a plural form, unless otherwise explicitly indicated in the context. It should also be understood that the terms "include," "have" and "comprise" used herein indicate existence of the features, units and/or components, but do not exclude existence of one or more other features, units, components and/or their combination. For example, the term "multiple" used here may indicate "two or more." The term "and/or" as used herein may comprise any and all combinations of one or more of various items listed in association. Relevant definitions of other terms will be provided in the description below.

In addition, some functions or structures known to those skilled in the art will be omitted in case they obscure embodiments of the disclosure in unnecessary details.

One embodiment of the present disclosure provides a method of recovering from a failure of a first node within a data storage system. A further embodiment may include receiving notice from a data storage system that a first node has failed. A further embodiment may include restoring a first node based on a heat map of data I/O activity to the first node. A further embodiment may include creating a new node, wherein the new node is a replacement for a failed node. A further embodiment may include restoring (hereinafter also referred to as copying) I/O data on a new node created based on data I/O activity. A further embodiment may include allowing reading restored data during the restore process.

A further embodiment may include a heat map of data I/O activity. A further embodiment of restoring a first node may include analyzing the heat map of data I/O activity to determine which portions of data are most active. A further embodiment of restoring a first node may include copying the most active data to the restored first node.

In a further embodiment, restoring may be enabled to be completed on a second node, wherein the second node may be enabled to replace a first node within a data storage system. A further embodiment may include predicting what is going to be most active in a first node after a crash occurs. A further embodiment may include a counting mechanism, which may further include a counter and decay mechanism. In an example embodiment there may be multiple counters for monitoring data I/O activity over a period of time, such as a counter for a given time period of a day and a different counter for a different time period. In many embodiments, a time period may be specified by a user and/or administrator. In some embodiments, a time period may be one or more hours, days, weeks, and/or other periods of time.

A further embodiment may include creating the heat map for data I/O activity to the first node. A further embodiment may include arranging in an ascending order data I/O activity in a heat map, wherein a most active data I/O activity is arranged first (top in a sequence) in the heat map and a least active data I/O activity is arranged last (bottom in a sequence) in a heat map. In an example embodiment a heat map may be a 2-dimensional or 3-dimensional representation, and other representations may be possible.

In a further embodiment a heat map may include a counter for each portion of data storage within the first node, wherein the counter is enabled to indicate a level of data I/O activity associated with an associated portion of data storage. In a further embodiment a counter for each portion of data storage within a first node may be incremented for each data I/O activity for each portion of data storage. In a further embodiment a decay mechanism may be employed to decrease a counter within a heat map, wherein each counter may be enabled to reduce over time. In many embodiments, a decay mechanism may be enabled to mirror a state of data referenced by a heat map, such as how hot or cold data is with regards to I/O activity. In various embodiments, a counter within a heat map may be configured to have a maximum value. In certain embodiments, once a counter equals a maximum value, the extent associated with the counter may be considered hot and/or have a high amount of I/O activity. In most embodiments, over time, the counter may decay as the I/O activity of an associated Extent decrease. In various embodiments, a user and/or administrator may be enable to configure a heat map, including, but not limited to maximum values of each counter and/or other values associated with the heat map.

In a further embodiment, creating a heat map may include monitoring each portion of a data storage within a first node, wherein monitoring may be enabled to indicate a level of data I/O activity associated with a given portion of a data storage.

In a further embodiment restoring a new node may include computing a recovery time for a restore to happen at the new node. In a further embodiment restoring a new node may include restoring data from a failed node to the new node based on the fastest computed time.

Throughout the description, extents may be sequential chunks of blocks, objects in an object store, file in a file store etc., and it should be obvious to one skilled in the art that other similar forms may be included herein. In the description, a storage may include a data storage, a file store, an object store, a database etc., and should be obvious to one skilled in the art that other forms of storage may be included herein.

Figure 1:
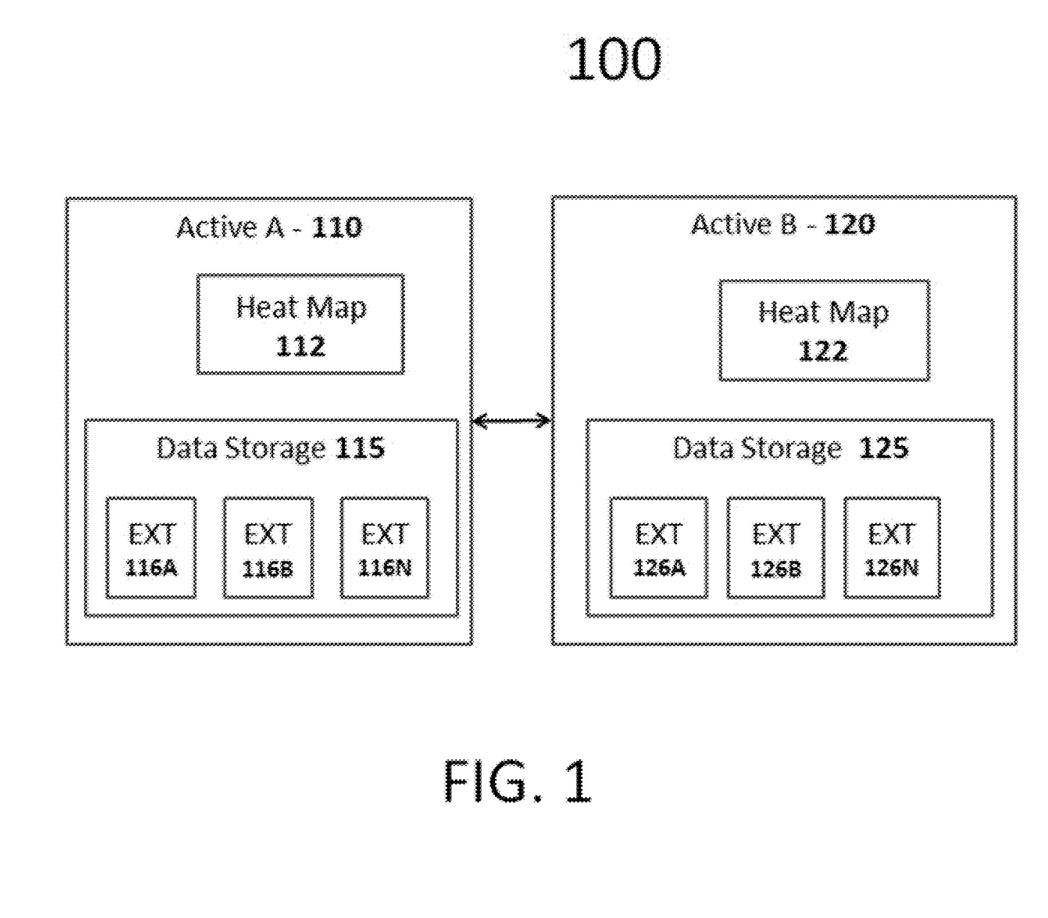
FIG. 1 illustrates a schematic diagram of an architecture comprising active nodes according to an exemplary embodiment of the present disclosure.

FIG. 1 illustrates a schematic diagram of an architecture of an active/active system 100 comprising active nodes according to an exemplary embodiment of the present disclosure. System 100 is an exemplary illustration considering two active nodes, and in one embodiment system 100 may include more than two active nodes. Each active node has a respective data storage and a heat map of data I/O activity. Active node 110 includes data storage 115, and active node 120 includes data storage 125. Heat map 112 represents data I/O activity for active node 110, and heat map 122 represents data I/O activity for active node 120. Extent 116A . . . 116N, is a contiguous area of storage reserved for a file in a file system, represented as a range in data storage 115. Similarly extent 126A . . . 126N is a contiguous area of storage reserved for a file in a file system, represented as a range in data storage 125. In active/active system 100, a user and/or an application may be able to access the same data from either active node 110 or active node 120, wherein accessing active node 110 would appear the same as accessing active node 120 and a user and/or application would not be able to distinguish between the active nodes being accessed with respect to data activity. In one embodiment, preferably heat map 112 and heat map 122 representing data I/O activity may be arranged in an ascending order of data I/O activity, wherein a most active data I/O activity is arranged first (top in a sequence) on the heat map and a least active data I/O activity is arranged last (bottom in a sequence) in the heat map.

Figure 2:
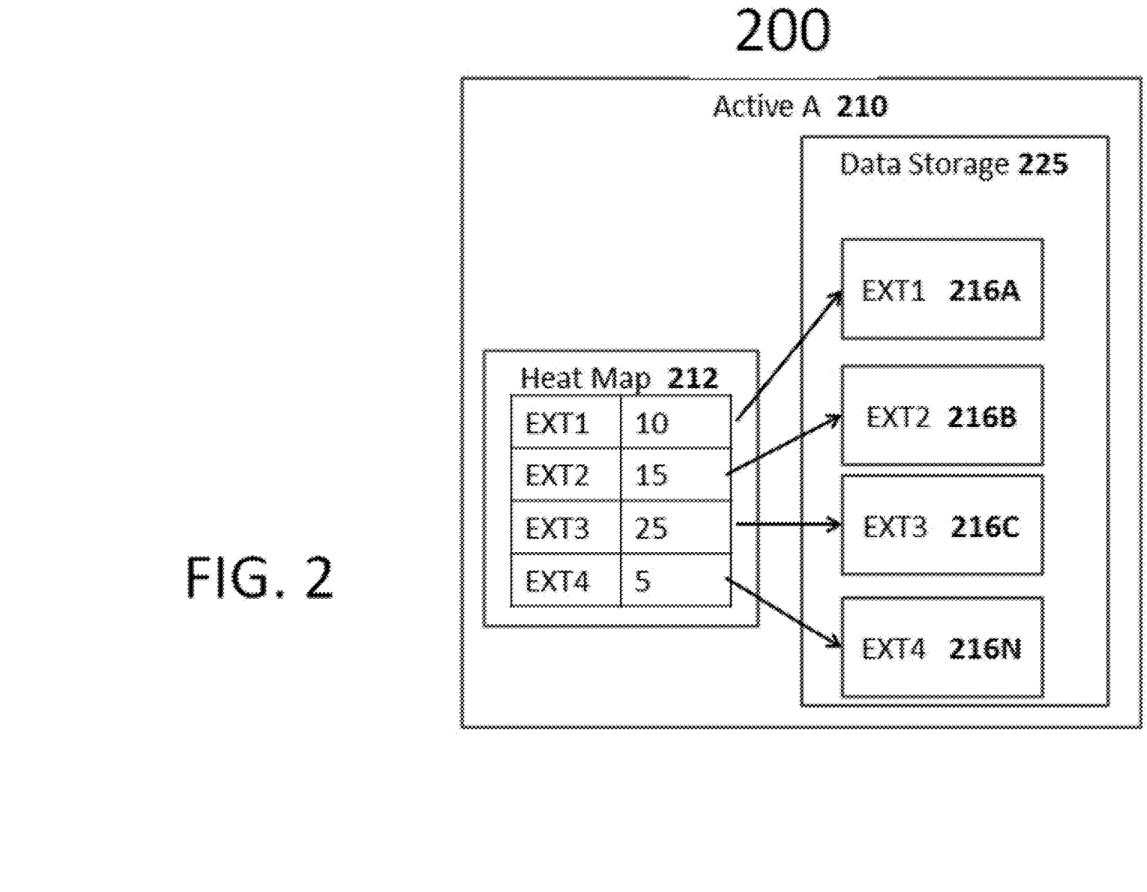
FIG. 2 illustrates a schematic diagram a node according to exemplary embodiments of the present disclosure.

FIG. 2 illustrates a schematic diagram an active node 200 according to exemplary embodiments of the present disclosure. Active node 210 has a heat map 212 that represents all data I/O activity with respect to the node. Active node 210 has data storage 225, wherein data storage 225 includes extents (216A . . . 216N, Generally 216). Extents 216 are contiguous areas of storage reserved for a file in a file system, represented as a range in data storage 225. Heat map 212 is a representation of data I/O activity in each extent, with respect to FIG. 2, where EXT1 in heat map 212 represents data I/O activity for extent 216A, EXT2 in heat map 212 represents data I/O activity for extent 216B, EXT3 in heat map 212 represents data I/O activity for extent 216C and EXT4 in heat map 212 represents data I/O activity for extent 216N.

In some embodiments, a heat map may be arranged in increasing order of data I/O activity. In some other embodiment, a heat map may be a 2-D table representing a contiguous area of storage reserved for a file in a file system (EXT1 in heat map 212) with the level of data I/O activity represented alongside. In an example embodiment of FIG. 2, EXT3 in heat map 212 has the highest data I/O activity, which is mapped to extent 216C in data storage 225. From this example embodiment, it can be inferred that for node 210, data I/O activity is highest (maximum) for extent 216C and data I/O activity is least for extent 216N. In a further embodiment, this data I/O activity may be for a given first time period. In a further embodiment, this data I/O activity may change in a second time period, wherein the second time period is different from the first time period.

Figure 3:
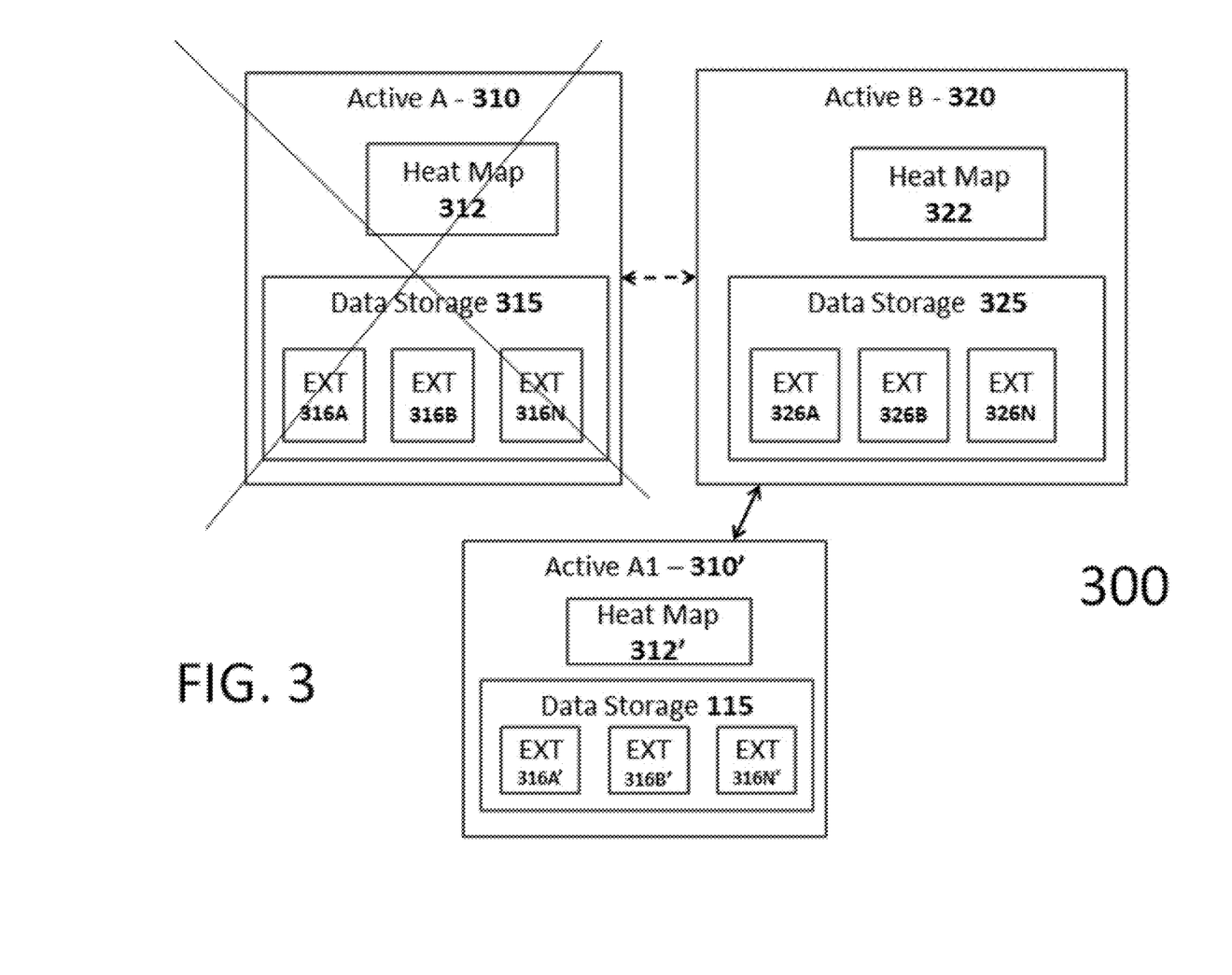
FIG. 3 illustrates a schematic diagram depicting recovery of a failed node according to exemplary embodiments of the present disclosure

FIG. 3 illustrates a schematic diagram depicting recovery of a failed node 300 according to exemplary embodiments of the present disclosure. As illustrated in FIG. 3, initially system 300 has two active nodes; active node A 310 and active node B 320, and system 300 in principle could include a plurality of active nodes. During the course of activity, active node A 310 has encountered a failure. In accordance with the embodiments of the present disclosure, failed node A 310 may be replace by newly created node A 310', which is a replacement node for failed node A310. For purpose of illustration and completeness, Active node 310 includes data storage 315, and active node 320 includes data storage 325. Heat map 312 represents data I/O activity for active node 310, and heat map 322 represents data I/O activity for active node 320. Extent 316A . . . 316N, is a contiguous area of storage reserved for a file in a file system, represented as a range in data storage 315. Similarly extent 326A . . . 326N is a contiguous area of storage reserved for a file in a file system, represented as a range in data storage 325. In active/active system 300, a user and/or an application may be able to access the same data from either active node 310 or active node 320, wherein accessing active node 310 would appear the same as accessing active node 320 and a user and/or application would not be able to distinguish between the active nodes being accessed with respect to data activity. In one embodiment, preferably heat map 312 and heat map 322 representing data I/O activity may be arranged in an ascending order of data I/O activity, wherein a most active data I/O activity is arranged first (top in a sequence) on the heat map and a least active data I/O activity is arranged last (bottom in a sequence) in the heat map When active node A 310 has failed, implying no operations (data I/O activity) are possible from node A 310, a controller (not shown in the Figure) may detect that active node A 310 has failed or receive a notification that active node A 310 has failed. On receiving a notification or detection of the failure of active node A310, a new node A' 330 is created, wherein the new node A' 330 is also an active node. Data is recovered from data storage 325 of active node B 320 to active node A' 330 based on heat map 322 or heat map 312, wherein the heat map 322 or heat map 312 contains activity information related to data stored and/or used by failed node A 310. Heat map 312' is the recreated heatmap for new active node 330. For example, Heat map 322, 312 may be stored in a memory. Based on data I/O activity from heat map 322, data related to failed node 310 is recovered and written from data storage 325 of active node B 320 to active node A' 330, thereby recreating the active node A which had failed. During the recovery process, the most active data, as designated in the heat map, is recovered to active node A' 330 first and the least active data is copied last to active node A' 330. During the restore process, i.e., the process of copying data to active node A' 330 from another node or a data storage, partial data that is copied to active node C 330 may also be accessed, after creation of active node A' 330.

In one embodiment, a heat map may be specifically used for the recovery process. In a further embodiment, a heat map may be updated continuously. In many embodiments, a node in process of being recovered is enabled to handle a portion of user I/Os to data accessible by a recovered node. In one embodiment, a controller, which may be configured to either detect failure of a node or receive a failure notification of a node may be part of an active node. In one embodiment, a controller may be part of data storage. In one embodiment, a controller may be part external to the nodes and the data storage but in constant communication with the nodes and the data storage. In a further embodiment, controller may be either a hardware element or a software element or a combination thereof.

Figure 4:
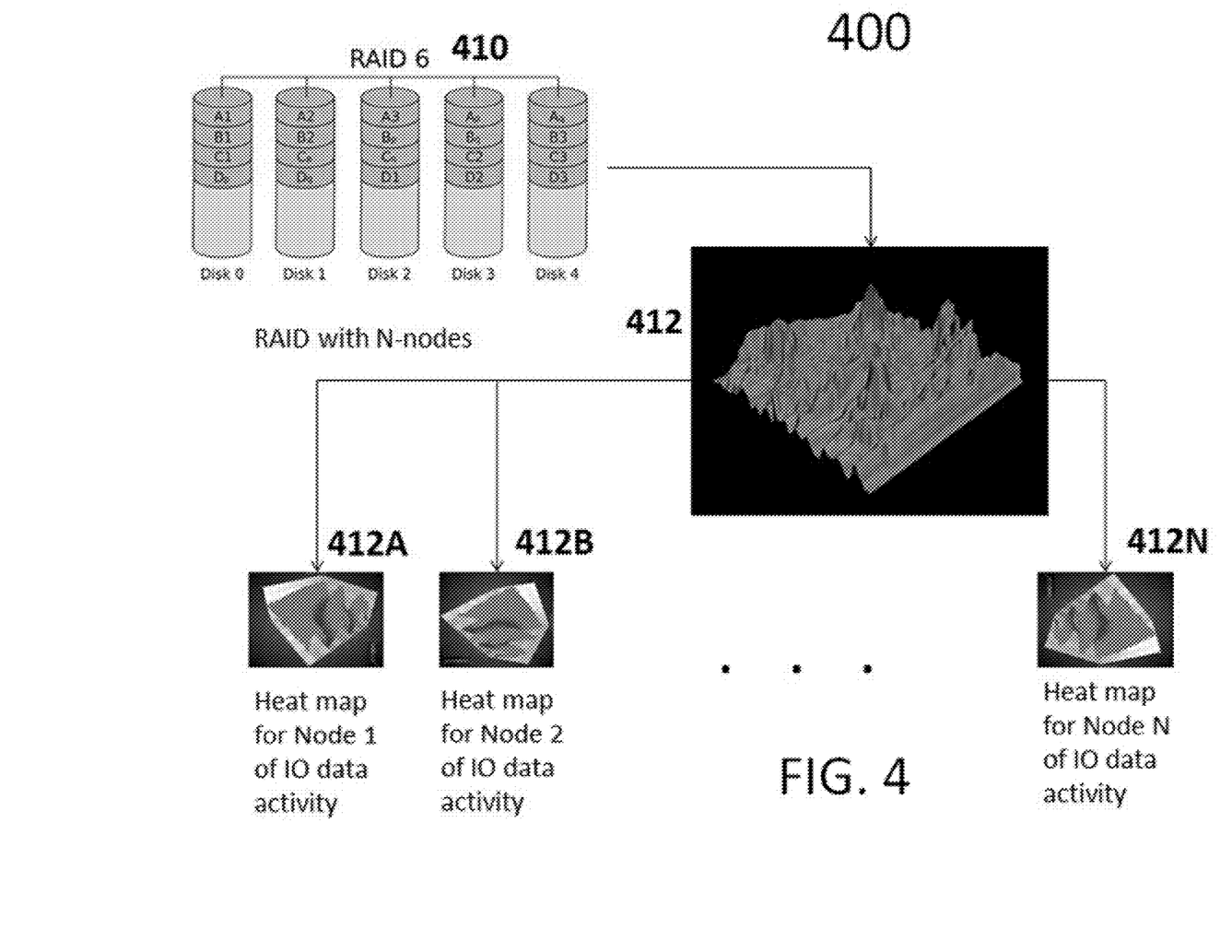
FIG. 4 illustrates a schematic diagram of an architecture according to an exemplary embodiment of the present disclosure.

FIG. 4 illustrates a schematic diagram of an architecture including an exemplary RAID system according to an exemplary embodiment of the present disclosure. RAID 410 comprises N nodes. RAID (redundant array of inexpensive disks, may be any system from RAID-0 to RAID-6) is a data storage virtualization technology that combines multiple physical disk drive components into a single logical unit for the purposes of data redundancy, performance improvement, or both. In one embodiment a node may be a data storage, a file store, an object store, a database etc. A basic set of RAID configurations employ techniques of striping, mirroring, or parity to create large reliable data stores from multiple general-purpose computer hard disk drives (HDDs). Most common types are RAID 0 (striping), RAID 1 and its variants (mirroring), RAID 5 (distributed parity), and RAID 6 (dual parity). For example, RAID 6 as shown in FIG. 4, extends RAID 5 by adding another parity block; thus, it uses block-level striping with two parity blocks distributed across all member disks. RAID 6 may not have a performance penalty for read operations, but it may have a performance penalty on write operations because of overheads associated with parity computations.

With reference to FIG. 4, a exemplary representation of RAID-6 architecture wherein a RAID may comprise a number of nodes (N Nodes). Each of the node in the RAID may be configured to have a separate heat map 412A . . . 412N. Alternatively, combined heat map 412 may represent data I/O activity of the complete RAID system, wherein combined heat map 412 is a collective sum of individual heat maps 412A . . . 412N of each of the N nodes of the RAID system.

The heat map represents data I/O activity associated with each of the N nodes of the RAID. For example, in FIG. 4, heat map 412A represents data I/O activity for node 412-A, and so on. RAID 410 may include a collective heat map 412, which is a combination of the individual heat maps 412A . . . 412N for the N nodes in RAID 410.

In many embodiments, a heat map may include a three (3) dimensional map of data I/Os. In other embodiments, a heat map may be represented in a two (2) dimensional table, such as illustrated in FIG. 2. In a further embodiment, each heat map mapped to a node may indicate the data I/O activity with respect to that node. In various embodiments, peaks in a heat map may indicate intense data I/O activity and troughs in the heat map may indicate low data I/O activity.

Figure 5:
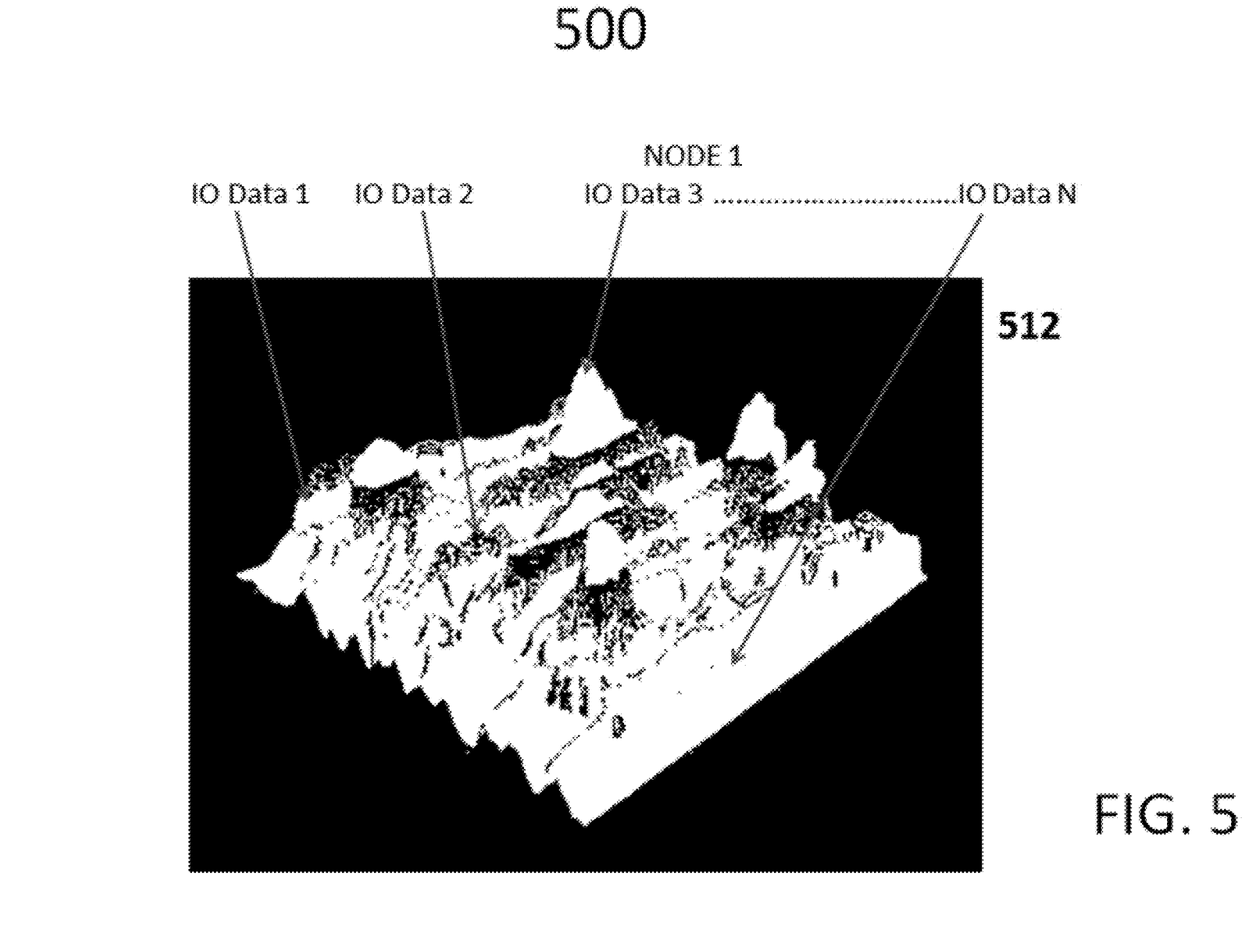
FIG. 5 illustrates a schematic diagram of a 3-D heat map for a node according to an exemplary embodiment of the present disclosure.

FIG. 5 illustrates a schematic diagram of a 3-D heat map for a single node according to an exemplary embodiment of the present disclosure. Considering a single node, there could be a number of data I/O activity with respect to that node. Heat map 512 may be a representation of the heat map of a single node (412A) or a collective heat map for all the nodes (412). The heat map 512 includes crests indicating high data I/O activity and troughs indicating low data I/O activity. From heat map 512, it may be found that for node 1, I/O data 3 is most active, and I/O data 2 is least active. When node 1 has failed and a new node is created, during a restore, I/O data 3 is first restored, then I/O data 1 and last I/O data 2 which is least active. The most active I/O data is first restored followed in descending order till the least active I/O data. In many embodiments, a user and/or application may be enabled to access restored data on a restored node while the restoration process is taking place.

Figure 6:
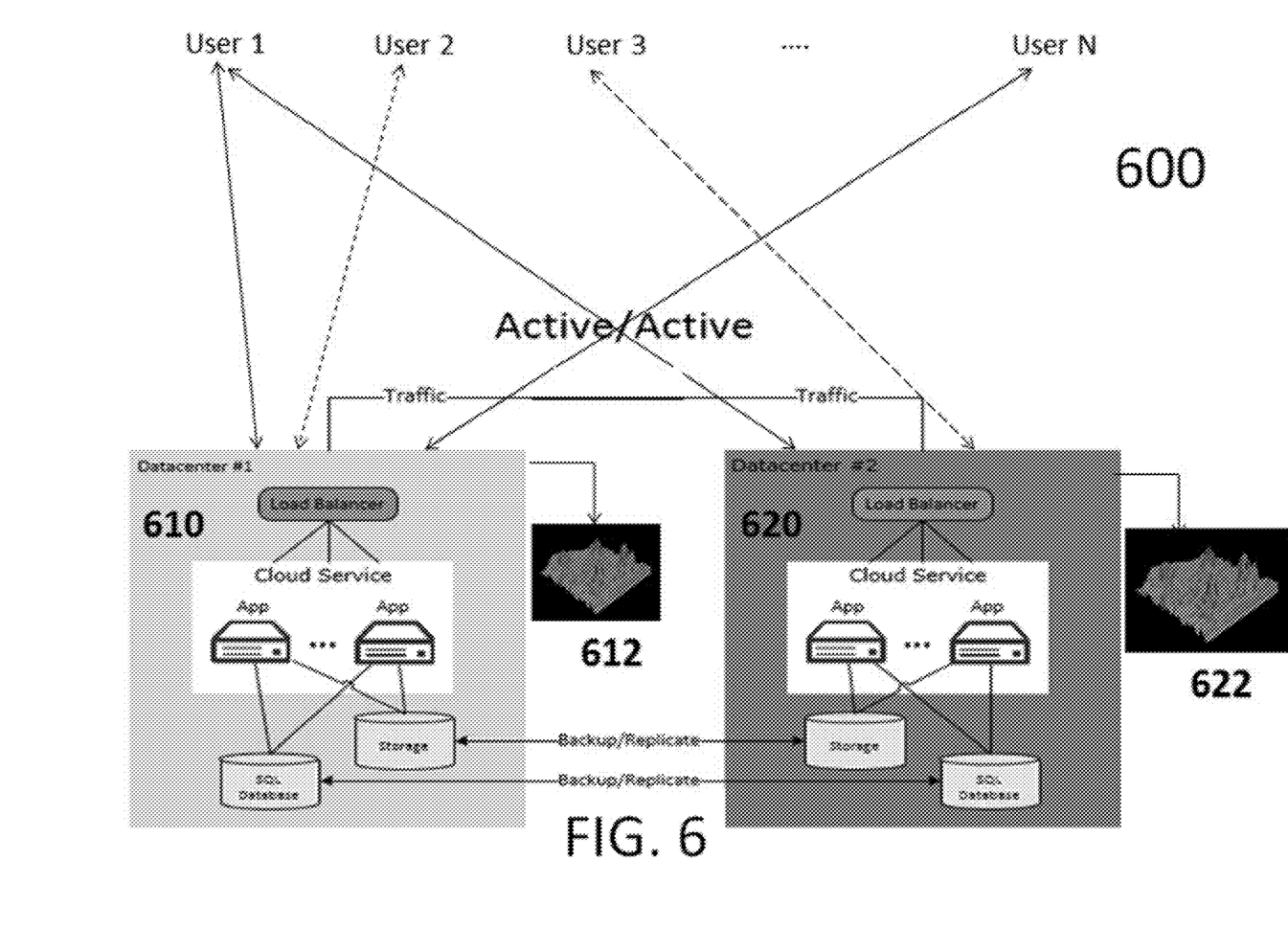
FIG. 6 illustrates a schematic diagram of an architecture of an active/active system according to an exemplary embodiment of the present disclosure.

FIG. 6 illustrates a schematic diagram of an architecture 600 of an active/active system according to an exemplary embodiment of the present disclosure. In FIG. 6 two active nodes are considered, active node 610 and active node 620. In the active/active setup, two Adaptive Servers (nodes) are configured as companion servers, each with independent workloads. These companions run on the primary and secondary nodes, respectively, as individual servers until one fails over. When a failover occurs, the secondary companion takes over the devices, client connections, and so on from the primary companion. The secondary companion services the failed-over clients, as well as any new clients, until the primary companion fails back and resumes its activities. Failback is a planned event during which the primary companion takes back its devices and client connections from the secondary companion to resume its services. During failover, clients connect to the secondary companion to resubmit their uncommitted transactions. During failback, clients connect to the primary companion to resubmit their transactions. Clients with the failover property reestablish their connections automatically. In an active/active setup users may be accessing either system for I/O data, and each active node will have its own heat map. Heat map 612 is associated with node 610 and heat map 622 is associated with node 620. User 1 may be accessing I/O data from node 1 and node 2 simultaneously. User 2 may be accessing I/O data only from active node 610 and so on. Users may generally access I/O data from all active nodes in a cluster.

Figure 7:
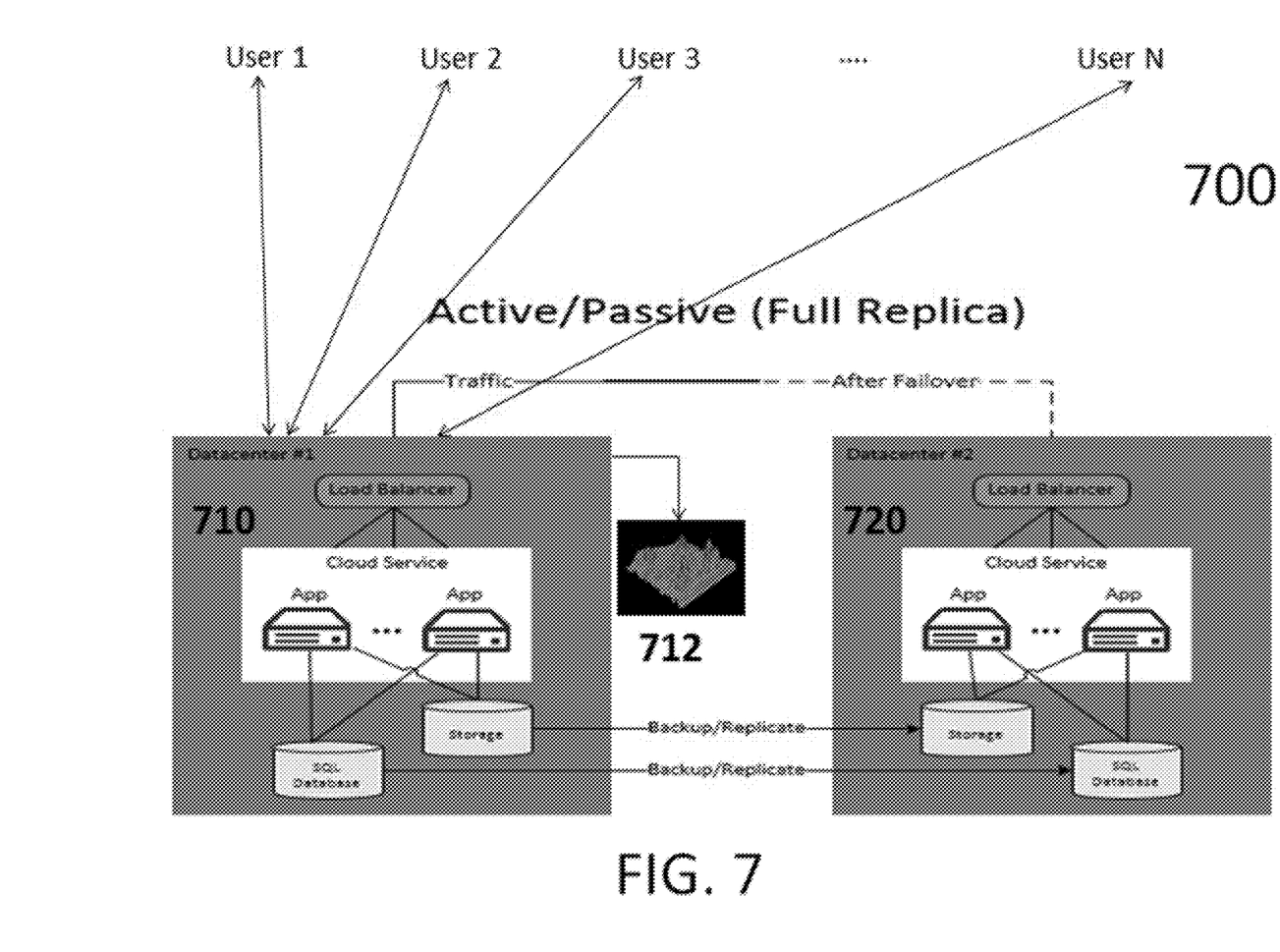
FIG. 7 illustrates a schematic diagram of an architecture of an active/passive system according to an exemplary embodiment of the present disclosure.

FIG. 7 illustrates a schematic diagram of an architecture 700 of an active/passive system according to an exemplary embodiment of the present disclosure. FIG. 7 illustrates an active node 710 and a passive node 720. In an active/passive setup, a single Adaptive Server runs either on the primary node or on the secondary node. The Adaptive Server runs on the primary node before a fail over and the secondary node after fail over. When a system fails over, the Adaptive Server and its associated resources are relocated to, and restarted on, the secondary node. Failback is a planned fail over or relocation of the Adaptive Server and its resources to the primary node. Failback is not required, but can be done for administrative purposes. During failover and failback, clients connect to the same Adaptive Server to resubmit uncommitted transactions. Clients with the failover property reestablish their connections automatically. Heat map 712, which represents data I/O activity, is associated with active node 710 and passive node 720 has no heat map. In an active/passive setup users are accessing I/O data only from the active node, as opposed to an active/active setup (FIG. 6), where users may be accessing I/O data from any active node based on the data I/O activity in the heat map. In an active/passive set-up, during a recovery period, both nodes may be active in a sense that read IOs may come to both nodes, but would prefer to go to a new node using a heat map of the data I/O activity for moving data to a newly created node and at the same time reading data from the newly created node.

Figure 8:
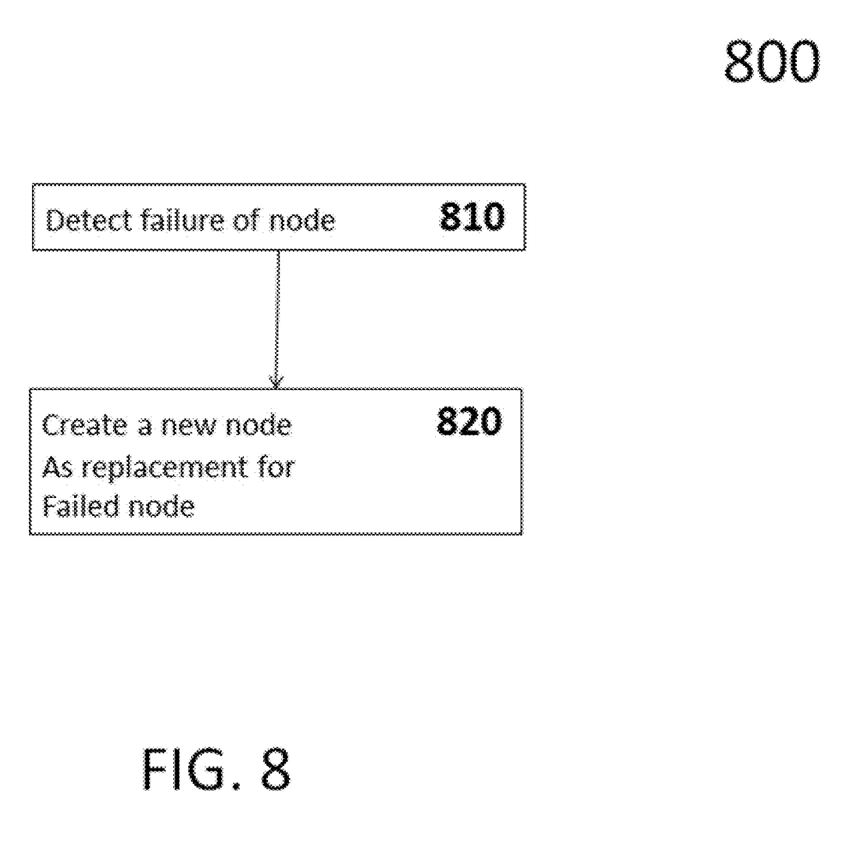
FIG. 8 illustrates a flow chart according to an exemplary embodiment of the present disclosure.

FIG. 8 illustrates a flow chart 800 according to an exemplary embodiment of the present disclosure. In step 810 a node failed is detected or alternatively a notification may be received regarding a node failure. In step 820, a new node is created as a replacement node for the failed node. Reference is made to exemplary embodiment of FIG. 3, wherein, node 320 has data storage 325, which has extents 326A . . . 326N. Active node A 310 and active node B 320 are in sync during all times. When active 310 fails, implying no data activity and/or operations are possible from active node A 310, a controller (not shown in the Figure) may detect that active node A 310 has failed or receive a notification that active node A 310 has failed. On receiving a notification or detection of the failure of active node A310, a new node, active node C 330 is created as a replacement node for failed active node A 310.

In one embodiment, on detection of a node having failed, a new replacement node is created for the failed node. In a further embodiment I/O data from another node may be copied to the new node thereby restoring the failed node. In a further embodiment, I/O data from another node may be copied based on a heat map associated with data I/O activity. In a further embodiment, I/O data having the highest data I/O activity is first restored and I/O data having the least data I/O activity is restored last. In a further embodiment, I/O data restored to the new node may be accessed during the restored process. In one embodiment in case of a RAID, the RAID may be recreated. In a further embodiment, to recreate a node in RAID-6, for example, data may be reconstructed by reading from N−2 nodes of the N nodes. In a further embodiment, for each block (in case of a block storage) that is recreated, data may need to be read from N−2 blocks, each from a different node.

Figure 9:
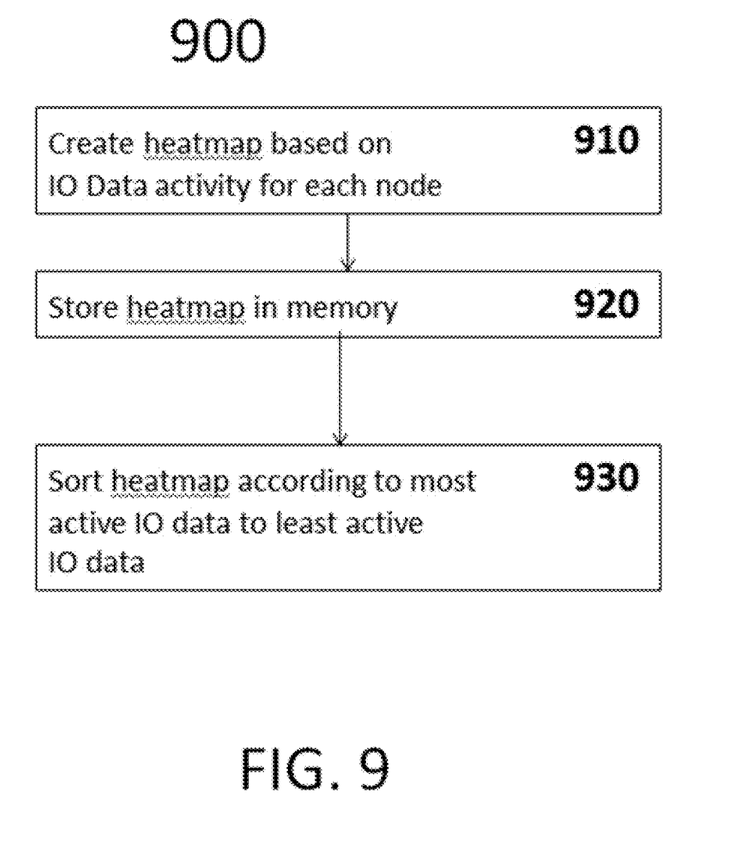
FIG. 9 illustrates a flow chart according to an exemplary embodiment of the present disclosure.

FIG. 9 illustrates a flow chart 900 according to an exemplary embodiment of the present disclosure. In step 910 a heat map for each node is created based on the data I/O activity. In step 920, the heat map is stored in a memory. In Step 930 the heat map is sorted in ascending order according to the data I/O activity for the node, in the odder of the most active I/O data on top and the least active I/O data at the bottom.

In one embodiment, a heat map may be specifically used during a recovery process. In a further embodiment, a heat map may be updated continuously. In one embodiment the heat map may be a 2-D table. In another embodiment the heat. map may be a 3-D map with crests (peaks) representing regions of high data I/O activity and troughs (shallows) representing regions of low data I/O activity.

Again, reference is made to exemplary embodiment of FIG. 3, wherein data may be recovered from data storage 325 of active node B 320 to newly created node, active node C 330 based on heat map 322, which contains data I/O activity information related to data stored and/or used by failed node, active node A 310. Based on data I/O activity from heat map 322, data from failed node 310 is recovered from active node B 320 to new active node C 330. During the recovery process, most active data, as designated in heat map 322, is recovered to new active node C 330 first and least active data is copied last to new active node C 330. During the restore process, i.e., the process of copying/restoring data to new active node C330 from another node or a data storage, partial data that is copied to new active node C 330 may also be accessed, after creation of new active node C 330. In many embodiments, a node in process of being recovered is enabled to handle a portion of user I/Os to data accessible by a recovered node.

Figure 10:
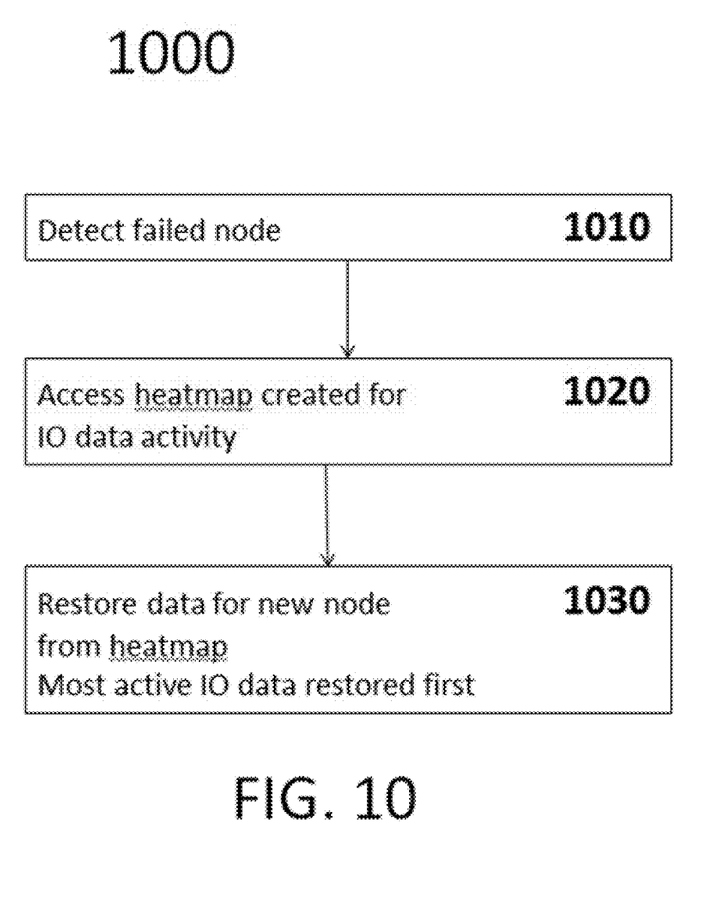
FIG. 10 illustrates a flow chart according to exemplary embodiments of the present disclosure.

FIG. 10 illustrates a flow chart according to exemplary embodiments of the present disclosure. In step 1010 either a notification is received that a node has failed or a node failure is detected. In step 1020 the heat map associated with the failed node representing data I/O activity is accessed to determine the data I/O activity pattern. In step 1030 from the heat map I/O data is restored to a new node created starting from the most active I/O data to the least active I/O data. In one embodiment during the restore process at the new node, I/O data may be accessed from the new node or another node having a copy of the data. Reference is again made to exemplary embodiment in FIG. 3, wherein when a failed node 310 is detected or a notification received, data I/O activity from heat map 322 is used to restore failed node 310 on newly created node 330, which has been described above and will not be described in detailed here again.

In one embodiment, the method disclosed herein is not aimed to reduce the total amount of time it takes to do recovery, but rather aimed to reduce the negative impact caused by the recovery process. In one embodiment, when a raid group loses one node, the recovery will be done based on access heat map.

In one embodiment a heat map may be a structure that may be stored in memory (but in some embodiments parts may be de staged to disk) that contains a few bytes that may be represented by every slice of data. In a further embodiment, it may be determined how active is this slice. In a further embodiment, a slice of data may be a sequential piece of data, and all slices will be of similar size. In an example embodiment, for block storage, 10 MB may be used, for object storage encounter different complexities in the RAID mechanism itself may be used, so different ECC functionality may be required. In some embodiments, bytes may be used as counters for the level of activity of each slice. In some other embodiments, every I/O done on a slice may increase a counter by 1. In some other embodiments, in order not to reach the limits, it may be costumed to have a decay mechanism, in order to reduce the counters.

In certain embodiments, in order to identify which are the most active slices in a data set, the heat map may need to be ordered in ascending order. In certain other embodiments, this mechanism may already be in use for auto Tiering, i.e., moving most active data to the faster drives, in physical storage systems. In a further embodiment, active data will be recovered first, as access to active data may be faster when data is up and running, and performance will significantly improve.

In an example embodiment, consider active/active mode. In a further embodiment, I/O operations (IOPS) may be divided equally between 2 nodes. In a further embodiment, while one node fails, the second receive all IOPS. In a further embodiment, this may lead to a node become over utilized and the latency may increase. In a further embodiment, data I/O activity heat map is used in order to restore the active data first. In a further embodiment, if there is a skew of 10/90, it would be sufficient to move 10% of data such that 90% of activity will be relevant for the 2 nodes. In a further embodiment, therefore, if there is something that directs activity between 2 nodes, it may actually be able to recuperate very quickly as it will need to move very little amount of data to allow the workload to evenly distribute between the 2 nodes, thus removing the bottleneck from the node.

In a further embodiment, if a local node fail, every I/O may be done remotely while recovering. In a further embodiment, if a heat map is used, small portions of the data (e.g. 10% in case of 10/90 skew) may be restored in order to make most access go via new node 90% of the times, and only 10% of data needs to be moved. Alternatively, in a further embodiment, if a local node fails, a new node may be preferred because a slave node has less resources, and not due to locality.

In a further embodiment, assume use of a node 2+2, i.e., 2 nodes containing actual data and 2 nodes containing ECC values of the first 2 nodes. In a further embodiment, such an approach may allow 2 crashes in a group of 4 nodes and still maintain stability. In a further embodiment, in a regular scenario, every read would go to one of the first 2 nodes. In a further embodiment, once one of them breaks, all reads going to that node would now go to one of the ECC nodes and to the original node. In a further embodiment, a number of IOPS would be duplicated and also, more compute may be required to translate the data from by reading the ECC data and data from node 2.

In one embodiment, a software based Raid controller may be in charge of the mechanism. In a further embodiment, on regular activity, the Raid controller may keep track on the activity going on in a system. In a further embodiment, if there are X nodes, then constructing one RAID group, having capacity of Y. In an example embodiment, 4 nodes, using RAID6-2+2, each node of size 1 TB such that the total capacity visible to user is 2 TB. In a further embodiment, a Raid controller may have, in memory (or in persistent storage) data I/O activity on each "slice" of data. In a further example embodiment, 2 TB will be divided into 200,000 slices of data, each of size 10 MB. In a further embodiment, once a node crashes, then recreate the slices in the order of their data activity. In a further embodiment, a Raid controller may keep track of how each slice is accessed (accessed from the new node or accessed via the existing nodes) and based on that, direct any I/O to the right location. In a further embodiment, based on this assumption a small portion of the slice may be responsible for a large portion of the activity.

Figure 11:
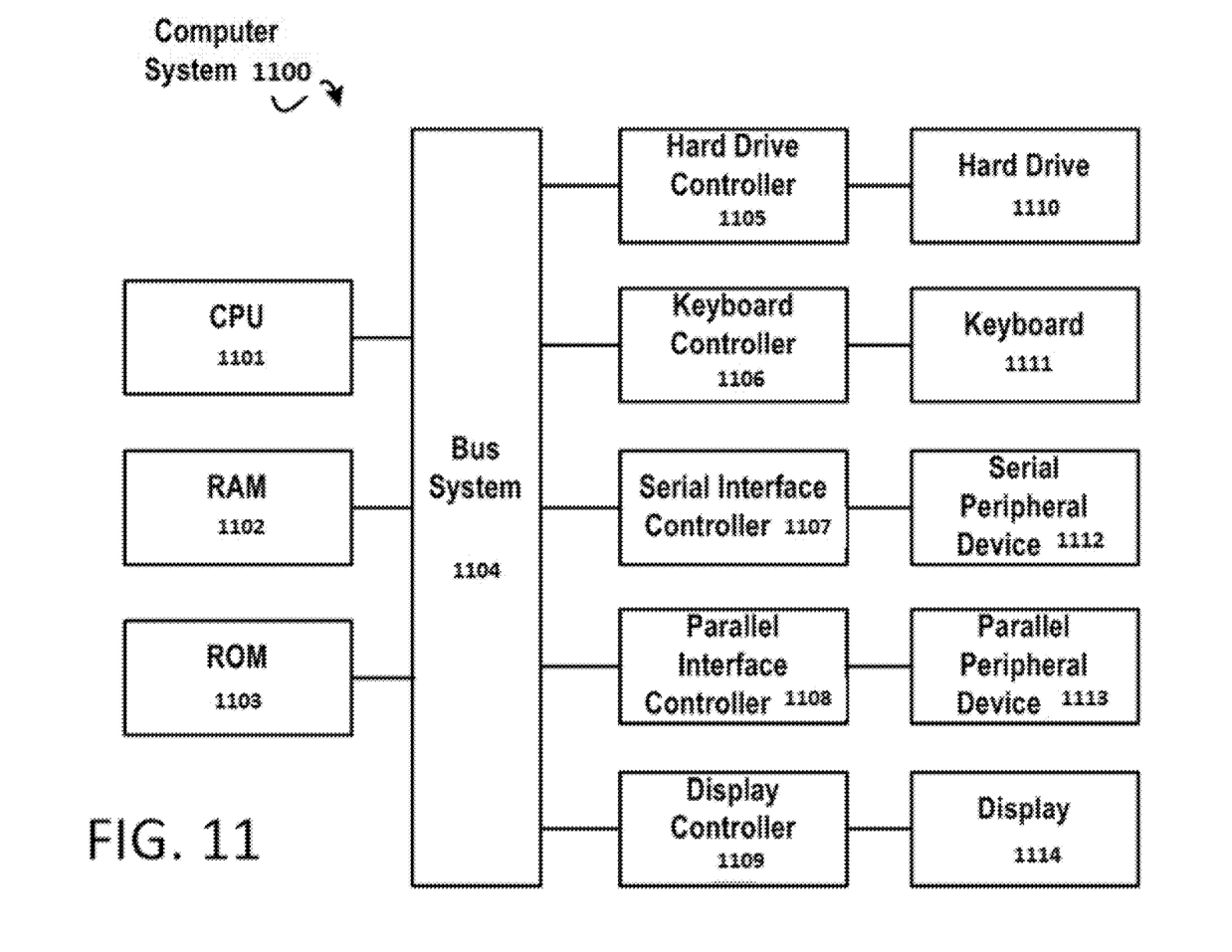
FIG. 11 is a block diagram of an apparatus according to example embodiment of the present disclosure.

Reference is now made to FIG. 11, which is a block diagram of an apparatus according to example embodiment of the present disclosure. As illustrated in FIG. 11, the computer system 1100 includes: CPU (Central Process Unit) 1101, RAM (Random Access Memory) 1102, ROM (Read Only Memory) 1103, System Bus 1104, Hard Drive Controller 1105, Keyboard Controller 1106, Serial Interface Controller 1107, Parallel Interface Controller 1108, Display Controller 1109, Hard Drive 1110, Keyboard 1111, Serial Peripheral Equipment 1112, Parallel Peripheral Equipment 1113 and Display 1114. Among above devices, CPU 1101, RAM 1102, ROM 1103, Hard Drive Controller 1105, Keyboard Controller 1106, Serial Interface Controller 1107, Parallel Interface Controller 1108 and Display Controller 1109 are coupled to the System Bus 1104. Hard Drive 1110 is coupled to Hard Drive Controller 1105. Keyboard 1111 is coupled to Keyboard Controller 1106. Serial Peripheral Equipment 1112 is coupled to Serial Interface Controller 1107. Parallel Peripheral Equipment 1113 is coupled to Parallel Interface Controller 1108. And, Display 1114 is coupled to Display Controller 1109.

Exemplary computer system 1100 is discussed only for illustrative purpose and should not be construed as a limitation on the embodiments or scope of the present disclosure. In some cases, some devices may be added to or removed from computer system 500 based on specific situations.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 11, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 12:
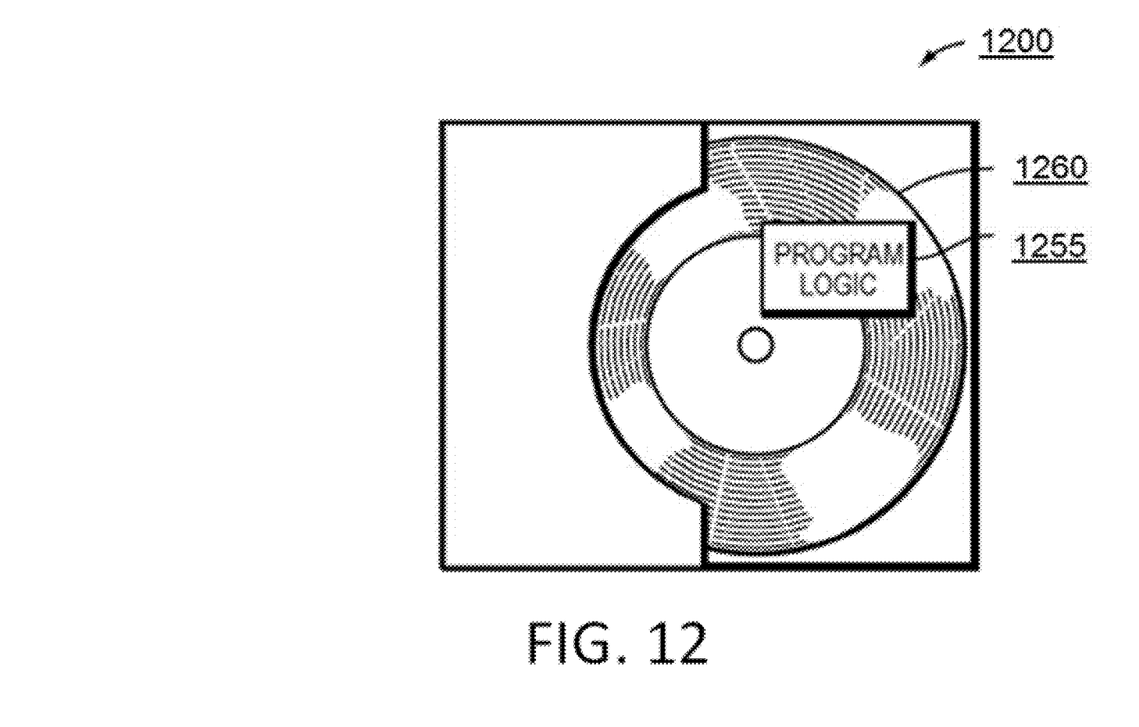
FIG. 12 is an illustration of an example embodiment of the present disclosure embodied in computer program code.

FIG. 12 is a block diagram of a computer program product 1200 including program logic 1255, encoded on a computer-readable medium 1260 in computer-executable code configured for carrying out the methods of the invention, according to an example embodiment of the present invention. The logic for carrying out the method may be embodied as part of the aforementioned system, which is useful for carrying out a method described with reference to embodiments shown.

The processes described herein are not limited to the specific examples described. For example, the processes 800, 900 and 1000 are not limited to the specific processing order of FIGS. 8-10, respectively. Rather, any of the processing blocks of FIGS. 8 to 10 may be re-ordered, combined or removed, performed in parallel or in serial, as necessary, to achieve the results set forth above.

The processing blocks (for example, in the processes 800, 900 and 1000 associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable sub-combination. Other embodiments not specifically described herein are also within the scope of the following claims.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention.

These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method of recovering from a failure of a first node within a data storage system, the method comprising:
   receiving notice from the data storage system that the first node has failed; and
   restoring the first node by creating a restored first node, from the data storage system, based on a heat map of data I/O activity to the first node, wherein the restored first node replaces the first node, wherein restoring the first node comprises:
   analyzing the heat map to determine which portions of data are most active; and
   restoring first the most active data to the restored first node.

2. The method according to claim 1, wherein the restoring is enabled to be completed on a second node, wherein the second node is enabled to replace the first node within the data storage system.

3. The method according to claim 1, further comprising creating the heat map for data I/O activity to the first node.

4. The method according to claim 3, wherein the heat map includes monitoring each portion of data storage within the first node, wherein the monitoring is enabled to indicate a level of data I/O activity associated with an associated portion of data storage.

5. The method according to claim 1, further comprising:
   accessing the restored node during a recovery of the restored node.

6. A system recovering from a failure of a first node within a data storage system, comprising at least one hardware processor; and at least one memory comprising computer program codes, wherein the at least one memory and the computer program codes are configured, with the at least one processor, configured for:
   receiving notice from the data storage system that the first node has failed; and
   restoring the first node by creating a restored first node, from the data storage system, based on a heat map of data I/O activity to the first node, wherein the restored first node replaces the first node, wherein restoring the first node comprises:
   analyzing the heat map to determine which portions of data are most active; and
   restoring first the most active data to the restored first node.

7. The system according to claim 6, wherein the restoring is enabled to be completed on a second node, wherein the second node is enabled to replace the first node within the data storage system.

8. The system according to claim 6, further comprising creating the heat map for data I/O activity to the first node.

9. The system according to claim 8, wherein the heat map includes monitoring each portion of data storage within the first node, wherein the monitoring is enabled to indicate a level of data I/O activity associated with an associated portion of data storage.

10. The system according to claim 6, further comprising:
    accessing the restored node during a recovery of the restored node.

11. A computer program product, the computer program product being embodied in a computer-readable non-transitory medium and includes a computer readable program instruction, and when being loaded into an apparatus, the computer-readable program instruction performs
    receiving notice from the data storage system that the first node has failed; and
    restoring the first node by creating a restored first node, from the data storage system, based on a heat map of data I/O activity to the first node, wherein the restored first node replaces the first node, wherein restoring the first node comprises:

analyzing the heat map to determine which portions of data are most active; and restoring first the most active data to the restored first node.

12. The computer program product according to claim 11, wherein the restoring is enabled to be completed on a second node, wherein the second node is enabled to replace the first node within the data storage system.

13. The computer program product according to claim 11, further comprising creating the heat map for data I/O activity to the first node.

14. The computer program product according to claim 13, wherein the heat map includes monitoring each portion of data storage within the first node, wherein the monitoring is enabled to indicate a level of data I/O activity associated with an associated portion of data storage.

15. The computer program product according to claim 11, further comprising:

accessing the restored node during a recovery of the restored node.

* * * * *